UNITED STATES PATENT OFFICE.

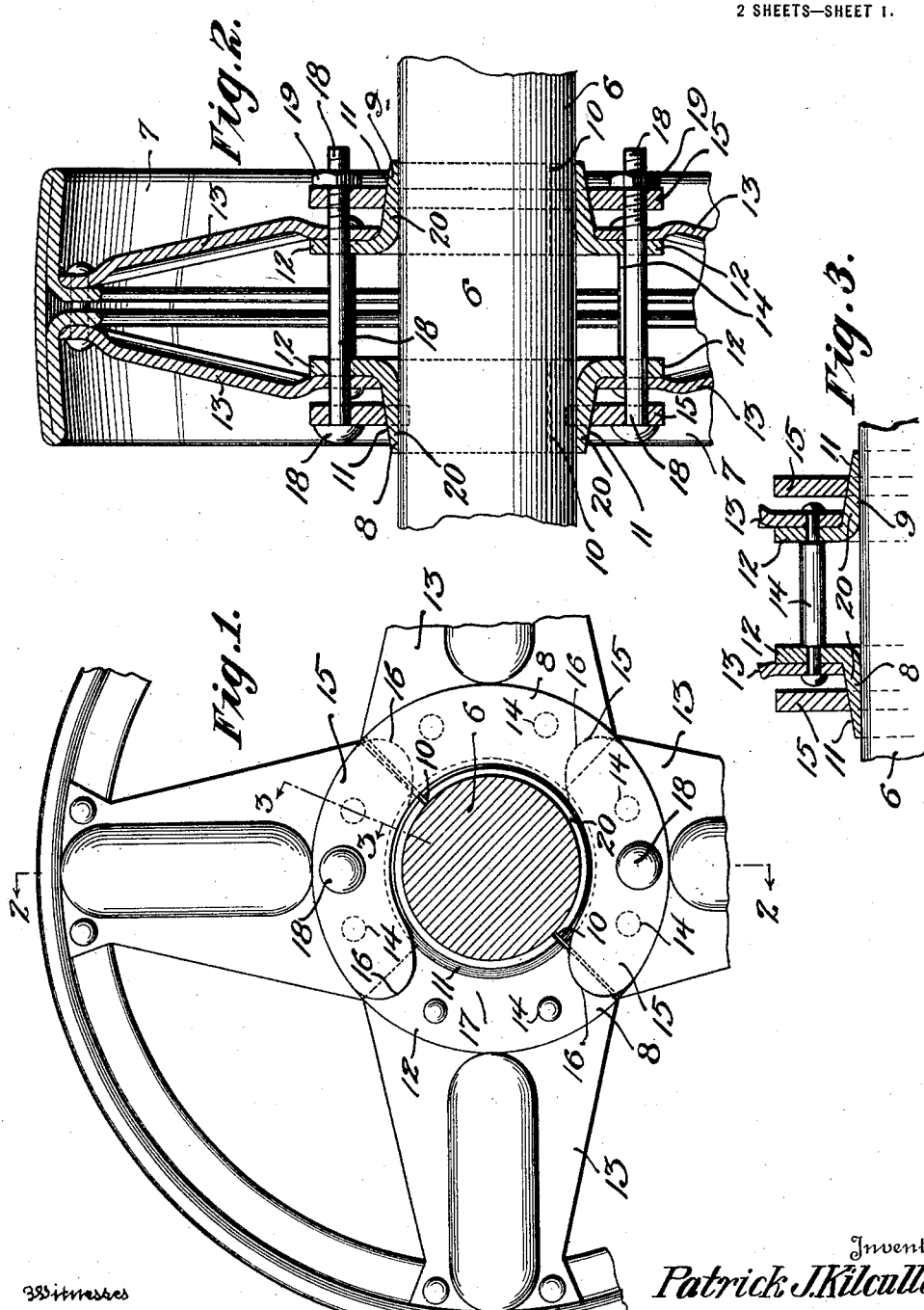

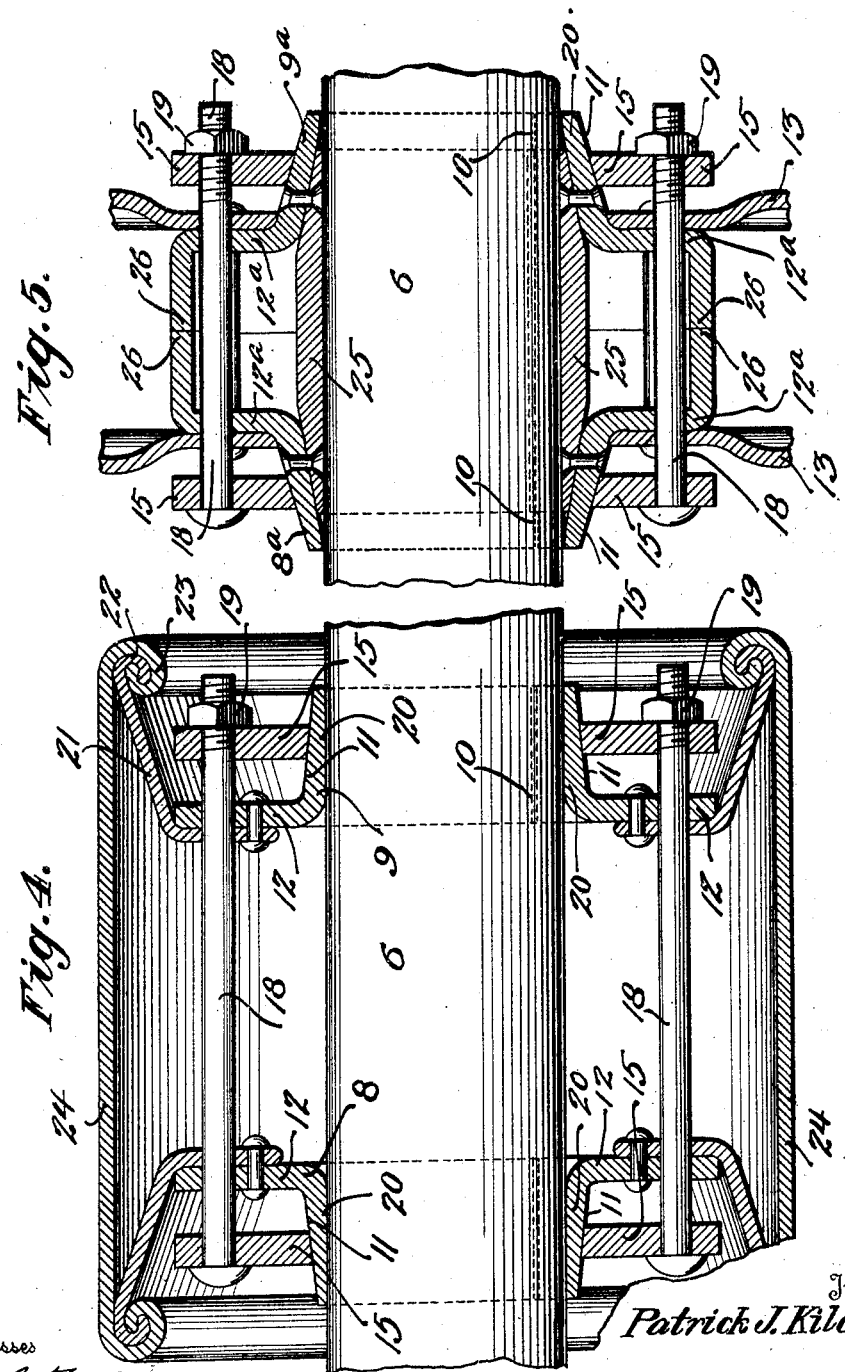

PATRICK J. KILCULLEN, OF PHILADELPHIA, PENNSYLVANIA.

WHEEL-HUB.

1,400,442.  Specification of Letters Patent.  Patented Dec. 13, 1921.

Application filed February 2, 1920. Serial No. 355,888.

*To all whom it may concern:*

Be it known that I, PATRICK J. KILCULLEN, a citizen of the United States, residing at Philadelphia, in the county of Philadelphia and State of Pennsylvania, have invented certain new and useful Improvements in Wheel-Hubs, of which the following is a specification.

One object of my invention is to provide an improved hub of the "split" type by the use of which pulleys and wheels can be quickly and securely attached to shafts and axles.

Another object is to so construct my improved hub that it will form ready attachment for the spokes, or when spokes are not used for the rim of a pulley or wheel, and may be attached to a shaft or axle in a convenient and easy manner.

A further object is to so arrange the parts of my improved hub that great power can be applied to the clamping means to effect the secure connection of the hub to a shaft or axle.

These objects, and other advantageous ends which will be described hereinafter, I attain in the following manner, reference being had to the accompanying drawings in which—

Figure 1 is a fragmentary face view showing my improved hub forming the part of a wheel, such for example as a pulley, and serving to securely connect the same to a shaft.

Fig. 2 is a fragmentary section taken on the line 2—2 of Fig. 1,

Fig. 3 is a fragmentary section taken on the line 3—3 of Fig. 1,

Fig. 4 is a view showing my invention serving to attach a spokeless pulley to a shaft in which the rim of the pulley is beaded or bent around a turned edge of a web to which the hub is attached, and Fig. 5 is a view of similar character to Figs. 2 and 4 showing another form of my invention in which the hub sections have inturned annular abutting flanges and a sleeve or bushing contained therein.

Referring to Figs. 1 to 3 inclusive, 6 represents a shaft or axle to which a pulley 7 having my improved hub thereon is attached. My improved hub includes two collars 8 and 9 which are split at 10 within their circumference so as to be applied directly to the shaft without having to be slid over the ends thereof. The outer surfaces 11 of the collars 8 and 9 are tapered or conical and these collars have annularly projecting flanges 12 to which the spokes 13 of the pulley can be attached for example by shouldered rivets 14, as clearly shown in Fig. 3, so as to space the collars apart as illustrated.

Partial clamping rings 15 have ends 16 spaced apart to provide an opening 17; the opening 17 being sufficiently wide to permit these rings to transversely span the shaft 6 so as to respectively engage the tapered surfaces 11 of the collars 8 and 9. In applying these partial rings 15, as clearly shown in Fig. 1, the openings 17 are diametrically opposite for the purpose of equalizing clamping pressure as will hereinafter be obvious.

Clamping bolts 18 extend in a direction substantially parallel with the length of the shaft 6 and include nuts 19. These clamping bolts extend through holes in the partial clamping rings 15, collars 8 and 9 and when the nuts 19 are tightened the partial clamping rings will be pulled toward each other and thereby cause the latter to slide upon portions of the collar surfaces 11 of greater diameter and this will cause the parts 20 of the collars to be clamped securely to the shaft 6. It will be noted that this clamping action can be easily and conveniently done for the reason that the nuts 19 are in a convenient position for the attachment of a wrench and a great clamping action can be secured due to the longitudinal arrangement of the bolts 18 co-acting to force the partial clamping rings 15 into transverse clamping relation with the parts 20 of the collars 8 and 9.

In the form of my invention shown in Fig. 4 the construction is substantially similar to that described in connection with Figs. 1 to 3 inclusive with the exception that instead of illustrating individual spokes which are attached to the flanges 12 of the collars 8 and 9, a spokeless pulley is illustrated having webs 21 which are secured to the flanges 12 of the collars 8 and 9 and these webs have turned edges 22 which are interlocked with turned edges 23 of the pulley rim 24.

In Fig. 5, I have illustrated an instance in which instead of having the collars bear directly against the shaft, a split bushing 25 is provided intermediate the collars $8^a$ and $9^a$ and the clamping action of the partial rings 15 is transferred to the split bushing which in turn serves to secure the hub to the shaft. Also in this form of my invention I have shown the flanges 12ª angular in cross section so as to provide abutting edges 26 and with this construction shouldered rivets, such as 14 above described, are unnecessary for the reason that the abutting edges 26 will prevent the collars 8ª and 9ª from moving together during the clamping action.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A hub of the character described including two spaced split collars for surrounding a shaft and having parts provided with a surface tapering to the axis of the shaft; members co-acting with the tapered surfaces of said collars; and clamping bolts movable in the direction of the length of the shaft whereby when said bolts are tightened, said members will be moved toward each other along said tapered surfaces of the collars and thereby clamp the latter to the shaft, said collars having connecting portions spaced apart serving as means of connection to the peripheral part of a rotatable member; substantially as described.

2. A hub of the character described including two split collars for surrounding a shaft and having parts provided with a surface tapering to the axis of the shaft; members co-acting with the tapered surfaces of said collars; and clamping bolts extending through said members in the direction of the length of the shaft whereby when said bolts are tightened, said members will be moved toward each other along said tapered surfaces of the collars and thereby clamp the latter to the shaft, said collars having flanges through which said clamping bolts extend, said flanges serving as means of connection for the spokes or web of a wheel; substantially as described.

3. A hub of the character described including two split collars for surrounding a shaft and having parts provided with a surface tapering to the axis of the shaft; members co-acting with the tapered surfaces of said collars; clamping bolts extending through said members in the direction of the length of the shaft whereby when said bolts are tightened, said members will be moved toward each other along said tapered surfaces of the collars and thereby clamp the latter to the shaft, said collars having flanges through which said clamping bolts extend, said flanges serving as means of connection for the spokes or web of a wheel; and means for preventing movement of said collars toward each other; substantially as described.

In testimony whereof I have signed my name to this specification in the presence of two subscribing witnesses.

PATRICK J. KILCULLEN.

Witnesses:
ANNA RENTON,
CHAS. E. POTTS.